United States Patent
Lindteigen et al.

(10) Patent No.: US 7,747,021 B2
(45) Date of Patent: Jun. 29, 2010

(54) METHOD AND APPARATUS FOR FAST SECURE SESSION ESTABLISHMENT ON HALF-DUPLEX POINT-TO-POINT VOICE CELLULAR NETWORK CHANNELS

(75) Inventors: Ty B. Lindteigen, Chandler, AZ (US); Bernard R. McKibben, Louisville, CO (US); William C. Neubauer, III, Gilbert, AZ (US); Jerry D. Ray, Phoenix, AZ (US); Michael A. Savage, Chandler, AZ (US); Bryce Sutherland, Gilbert, AZ (US); Barbara S. Winterfield, Mesa, AZ (US); Keith M. Klug, Mesa, AZ (US); Stuart S. Kreitzer, Coral Springs, FL (US); Brent M. McKay, Chandler, AZ (US); Bradley J. Rainbolt, Sunrise, FL (US); Fred R. Villa, Gilbert, AZ (US); Marc A. Boillot, Plantation, FL (US)

(73) Assignees: General Dynamics C4 Systems, Inc., Scottsdale, AZ (US); Motorola, Inc., Schaumburg, IL (US)

( * ) Notice: Subject to any disclaimer, the term of this patent is extended or adjusted under 35 U.S.C. 154(b) by 1411 days.

(21) Appl. No.: 11/132,707

(22) Filed: May 18, 2005

(65) Prior Publication Data

US 2006/0269065 A1 Nov. 30, 2006

(51) Int. Cl.
*H04L 9/00* (2006.01)
(52) U.S. Cl. .................................. 380/274; 380/270
(58) Field of Classification Search .................. 380/270, 380/274
See application file for complete search history.

(56) References Cited

U.S. PATENT DOCUMENTS 5,402,491 A 3/1995 Locascio et al.

(Continued)

OTHER PUBLICATIONS

Bradley J. Rainbolt et al., U.S. Appl. No. 10/926,830, Crypto-Synchronization for Secure Communication, filed Aug. 26, 2004.

(Continued)

*Primary Examiner*—Nasser Moazzami
*Assistant Examiner*—Lisa Lewis
(74) *Attorney, Agent, or Firm*—Ingrassia Fisher & Lorenz, P.C.

(57) ABSTRACT

Methods and apparatus are provided for secure communication techniques in a communication system. The system can include a first device which communicates with a second device over a channel. A security association can be established during a first session between the devices via an asymmetric key exchange. The security association comprises a Traffic Encryption Key (TEK) and a first state vector. The TEK comprises a shared, secret symmetric key. The security association is stored in each of the devices for use during a second session between the devices to expedite security association establishment during call set-up of the second session. The security association can be associated with the second device in the first device, and with the first device in the second device. An updated state vector can be generated at the first device. A second session can be established between the first device and the second device by using the TEKs from the first session and the updated state vector. The security association can be used to encrypt voice packets being sent from the first device to the second device. The security association and updated state vector can then be used to decrypt the encrypted voice packets received by the second device from the first device.

9 Claims, 7 Drawing Sheets

U.S. PATENT DOCUMENTS

| | | | |
|---|---|---|---|
| 5,615,266 A * | 3/1997 | Altschuler et al. | 713/162 |
| 5,768,380 A | 6/1998 | Rosauer et al. | |
| 6,477,150 B1 | 11/2002 | Maggenti et al. | |
| 6,477,387 B1 | 11/2002 | Jackson et al. | |
| 7,003,114 B1 * | 2/2006 | Mauro | 380/261 |
| 7,069,031 B2 | 6/2006 | Maggenti et al. | |
| 2002/0172364 A1 | 11/2002 | Mauro | |
| 2003/0012149 A1 | 1/2003 | Maggenti et al. | |
| 2004/0171400 A1 * | 9/2004 | Rosen et al. | 455/518 |
| 2005/0025315 A1 * | 2/2005 | Kreitzer | 380/270 |
| 2006/0123224 A1 | 6/2006 | Klug et al. | |

OTHER PUBLICATIONS

International Search Report for Application No. PCT/US06/16928 mailed on Oct. 16, 2008.

* cited by examiner

METHOD AND APPARATUS FOR FAST SECURE SESSION ESTABLISHMENT ON HALF-DUPLEX POINT-TO-POINT VOICE CELLULAR NETWORK CHANNELS

TECHNICAL FIELD

The present invention generally relates to data communications and, more particularly, to systems and methods for providing secured data transmission in a half-duplex communications system.

BACKGROUND

Wireless and wireline telephone services typically provide point-to-point (or one-to one) service. By contrast, a group call (GC) or dispatching service can provide point-to-multipoint (or one-to-many service). These point-to-multipoint (PTM) communication systems can provide communications between a central location and multiple users of the system.

Many common communication protocols can provide dispatch services in which many users can allow another user in their group to communicate over a wireless channel to those users in a private communication group (PCG). Communication over the wireless channel can be accomplished via one of a variety of multiple access techniques which can include, but are not limited to, for example, time division multiple access (TDMA), frequency division multiple access (FDMA), and code division multiple access (CDMA). Common dispatch service applications include local police radio systems, taxi-cab dispatch systems, Federal Bureau of Investigation and secret service operations, and general military communication systems. For example, dispatch systems using Land Mobile Radios (LMRs) have been used in trucks, taxis, buses, and other vehicles in order to communicate information between a central dispatch center and group of members. Communications may be directed at a specific group member or to all group members simultaneously.

A group call service (GCS) may allow one user to talk to a group of users in, a half-duplex or full-duplex mode. This typically allows one user of the group sole access to a dedicated channel. A GCS can be provided for quick, efficient, one-to-one or one-to-many (group) communication.

Push-to-Talk (PTT) Systems

One example of a GCS can be implemented as a wireless push-to-talk (PTT) dispatch system. PTT systems are typically used in setting where a group of people, or members, require communications with each other in a PTM fashion. The group of people requiring communications with each other is commonly known as a "net," each member of the net sometimes referred to as a "net member." These systems can allow a talker to establish a radio connection to other active users in the talker's specific subscriber group. These systems may transparently dispatch the user's traffic information, such as voice and/or data, from the talker to the rest of the group or net members, who may be considered "listeners." The operation of PTT systems is similar to a "walkie-talkie." These PTT systems are often identified as having a "push-to-talk, release-to-listen" feature. As a result, the user does not need to go through a typical dialing and ringing sequence. Examples of push-to-talk applications can include workgroup communications, security communications, construction site communication, and localized military communications. These dispatch systems can allow for landline and wireless access to the system.

PTT services are typically half-duplex (in some cases semi-duplex). As such, only one member may typically transmit information to the other members at any given time. Members desiring to transmit to other members of the system typically send an access request by depressing a PTT button on their communication device while talking and then release it when they are done. By doing so, the user's device sends a service request which requests permission from the network to use a reverse link transmission channel. This service request triggers a radio or a server, which indicates the user's request for the "floor." When the service request is granted, the communication channel is effectively reversed so that the talking user can send information over the same communication channel the user was previously receiving on. The talking user's voice is routed from the reverse link to telephony infrastructure and broadcast to other group or net members over the forward link. Typically, a dedicated channel can be used to transmit communications from one member to multiple other group or net members simultaneously. The dedicated channel may comprise a single channel or frequency, or a group of individual channels managed by a controller to imitate the single channel.

Each user monitors a common broadcast forward link signal. Each user can also listen to the dedicated broadcast channel to receive communications from the single member who is transmitting.

After the voice connection has been established, the talking user can talk for a while and the other users listen on the channel. If another group or net member attempts to transmit over the broadcast channel while another member is transmitting, that member will receive an audible "busy" signal indicating the channel is already taken. Likewise, if two group or net members attempt to simultaneously transmit to an idle channel, the infrastructure only assigns one of the members the resource/floor, and the other member receives the audible "busy" signal until the PTT is released, at which point voice reception occurs.

Listening users may request the floor by pressing their PTT button to respond. This way the system knows which direction the signal should be traveling in. The permission to talk may be moderated by the infrastructure and the network can either reject the request or allocate the requested resources on the basis of predetermined criteria, such as the availability of resources, priority of the requesting user, etc. A user can belong to many groups at a same time. As such, the communications system must be able to select and prioritize the group the user listens to if there are multiple group communications to the user occur at the same time.

Secure Communications

Encryption of end-to-end communication is an increasingly important feature, particularly for wireless communication devices. Data networks can use cryptographic techniques to transmit data securely from one location in a network to another location in the network.

Encryption can be applied to voice as well as data. Typically, a device connected to the network encrypts data using a cipher or encryption algorithm and an encryption key. Using voice as an example, a secret encryption key can be used to encode voice on the source handset using the encryption algorithm. The encrypted voice stream can then be transmitted securely over a cellular communication system to a destination or target device. In order to decode the encrypted voice stream, the destination device must use the same secret encryption key that was used to encrypt the voice stream and apply a cipher or decryption algorithm.

In symmetric or "secret-key" type cryptographic systems, symmetric key algorithms use identical encryption and decryption keys are used to encrypt and decrypt the data.

Thus, to exchange enciphered data a single key value must be shared between the originator and the recipient and protected by both parties.

In asymmetric or "public-key" type cryptographic systems, asymmetric key exchange (AKE) algorithms use separate public and private keys. Existing asymmetric key exchange algorithms include, for example, Diffie-Hellman, Rivest, Shamir, and Adelman (RSA), Digital Signature Algorithm (DSA), ElGamal, and Elliptic Curve Cryptography (ECC). In such asymmetric cryptographic systems, a single operation is used to generate the pair of public and private keys. The public key can be made publicly available and can be safely shared with everyone including the other party to a secure communication. The private key is kept secure or secret by the individual who generated the key pair. To exchange encrypted data each party to the exchange makes their public key available, and keeps their private key secret. The keys are typically different from each other, but neither key can be deduced from the other. Because the private key needs to be kept only by one party, it never needs to be transmitted over any potentially compromised networks.

Two sides of a communication session generate symmetric private keys through the exchange of public keys. The two sides agree beforehand on the exact algorithm to use, and each side then selects a random number as a private key and uses the algorithm and the random number to generate a public key. The two sides exchange public keys and then each generates a session key using their own private key and the other side's public key. Even though neither side knows the other side's private key, both sides' session keys are identical. Data enciphered by using one key of the pair may be deciphered using the other key of the pair. The originator of an exchange enciphers the data using the public key of the recipient. The recipient is then able to decipher the received data using his own private key. A third party intercepting the public keys but lacking knowledge of either private key cannot generate a session key. Therefore, data can be securely encrypted with the session key. An asymmetric key pair may remain unchanged over many sessions. Because one key pair is associated with one party, even on a large network, the total number of required keys is much smaller than in the symmetric case.

Although AKE methods are convenient compared with alternatives such as manual key loaders, they are relatively slow as a result of being computationally intensive and because of the large keys needed for good security. To avoid this speed penalty, most secure devices use AKE only to establish the public key (shared by both sides) and then revert to fast symmetric-key encryption algorithm such as DES or AES to encrypt and decrypt the traffic.

Call set-up refers to the time elapsed between pressing the send or push-to-talk button and the call connecting to a secure traffic channel. Because AKE is relatively slow on wireless devices, it noticeably delays call setup. Excessive set-up time is particularly harmful to the user experience on dispatch calls which are bursty in nature and are adversely affected by even small set-up delays.

Conventional PTT cellular services provide network enabled security over the air link between the mobile and the network. By contrast, in trunked radio dispatch systems, users are provided with pre-placed or pre-loaded keys that can be used to encrypt voice. In the context of AKE schemes applied to other wireless communication systems, such as full duplex point-to-point cellular systems, once a shared symmetric key has been used, that shared, symmetric key is typically discarded and a new shared, symmetric key is generated the next time a user wants a secure communication session.

There is a need for PTT-type systems which can enable end-to-end security for point-to-point calls between mobile PTT clients. In addition, it is desirable if such systems could avoid unnecessary key exchanges to reduce or eliminate call set-up delays typically associated with establishing such secure communications. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will be described in conjunction with the following drawing figures, wherein like numerals denote like elements.

DETAILED DESCRIPTION

Figure 1:
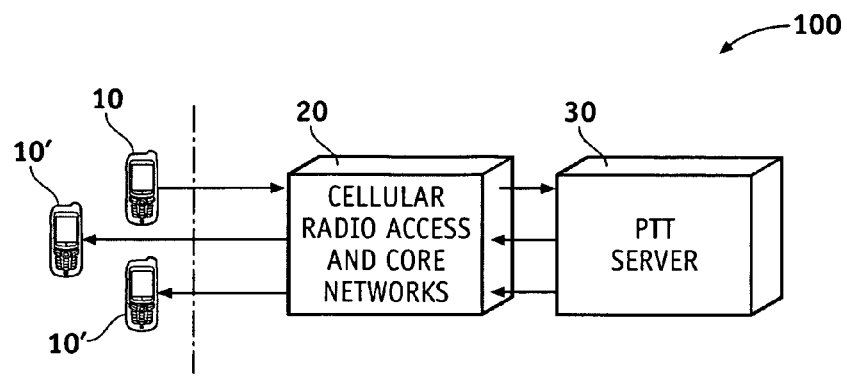
FIG. 1 is a block diagram of a generic PTT wireless communication system that can provide secure communications between two users.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

DEFINITIONS

An initiating device is used herein to refer to a device that initiates a secure communication with a listening device. A listening device is used herein to refer to a device that receives communications from the initiating device. It should be appreciated that the term "device" can generally refer to a wireless communication device or other hardware with which an access network communicates. A device may be mobile or stationary and can include devices that communicate through a wireless channel or through a wired channel. A device may further be any of a number of types of devices including but not limited to PC card, compact flash, external or internal modem, wireless or wireline phone, or personal digital assistant (PDA). A device may be a mobile telephone which includes a mobile telephone handset, also called mobile equipment (ME), and a memory module, such as a physically secure integrated circuit card or smart card called UICC, which may be removable or permanently attached to the ME. In a Global System for Mobile communication (GSM) telephone, the UICC is typically a Subscriber Identity Module (SIM). In a code division multiple access (CDMA) telephone, the UICC is typically a removable user identity module (RUIM).

Call Setup Encryption (CSE) is used herein to refer to a method of encrypting portions of asymmetric key exchange messages with a shared secret known to an initiating device and a listening device as a way of providing authentication of corresponding client identity.

Push-To-Talk (PTT) voice is used herein to refer to a half-duplex voice operation in which an initiating device can request a voice channel via a PTT button and wait for an access grant before placing voice on a PTT channel to a listening device. Although the operation of the service is half-duplex, full duplex cellular traffic channels may be used to implement the service.

A Security Association (SA) is used herein to refer to a set of mutually agreed upon security parameters between two clients or parties, such as, between an initiating device and a listening device. A security association can be used to encrypt and decrypt the traffic between the parties. The security association between an initiating device and a listening device is established via an asymmetric key exchange. Parameters included in a SA comprise client IDs, a Traffic Encryption Key (TEK), and a TEK state vector. A Traffic Encryption Key (TEK) is used herein to refer to a symmetric key generated as part of an asymmetric key agreement exchange used to encrypt and decrypt voice/data traffic being sent between an initiating device and a listening device.

A point-to-point communication refers to a communication between an initiating device and a listening device over a dedicated channel. By contrast, a broadcast or point-to-multipoint communication refers to a communication between an initiating device and plurality of listening devices over a common channel. The term dedicated channel refers to a channel modulated by information specific to an individual device. The term common channel refers to a channel modulated by information shared among all devices in a group.

Overview

Embodiments of the present invention provide methods and apparatus that allow for secure communications in a half-duplex wireless dispatch system, such as a PTT system. These methods and apparatus can help to quickly establish secure point-to-point calls in cellular based PTT systems. End-to-end security techniques are provided wireless network architectures which implement half-duplex, point-to-point cellular voice calls on cellular PTT channels. The existing cellular infrastructure does not need to be changed to support these end-to-end security techniques. In fact, because security is independent of the network, the same traffic encryption key (TEK) can be used in different wireless communication systems which can allow a user to switch between CDMA, TDMA, etc.

Each wireless device generates a public/private key pair that is stored in the device indefinitely or until the user decides to create a new one. When two users speak for the first time, the users exchange their public keys and negotiate a shared, secret symmetric TEK via an asymmetric key exchange process. This shared symmetric key TEK can be used to encrypt information when communicating with a new person or device for the first time. Security association establishment can be expedited by caching this TEK. The cached TEK can be used in another secure session between the two users to help provide rapid secure call set up.

For example, once negotiated, the TEK can be stored in a persistent storage device such as a cache or flash memory. In one embodiment, a unique public and symmetric key pair can be stored by each user for each corresponding user. Once the TEK has been negotiated with another user or group of users, the shared (secret) symmetric TEK can then be stored for future use and associated with the other users handset so that the TEK can then used to encrypt information during a subsequent secure communication session with that same party. Storing the TEK for future use can eliminate the need to conduct a long negotiation process during call set-up. Once the wireless communication device recognizes that a TEK for another caller has already been negotiated and stored, the wireless communication device no longer needs to negotiate the TEK. This allows for rapid secure call set-up, which helps support rapid connection objectives of PTT systems. In some embodiments, there is no increase in call set-up time since there is no need to negotiate a TEK. Thus, by caching the security association parameters, secure PTT call set up times can be improved.

According to another feature of the present invention, synchronization messages can be sent to the receiver to compensate for any packets lost or gained during transmission. According to one embodiment, the synchronization messages can be incorporated within and transmitted in place of encrypted voice packets of a voice frame. In one embodiment, the synchronization messages are sent in a portion of a voice frame (as opposed to being sent in a full voice frame) in locations that occupy/replace the least important or significant vocoder bits, e.g., bits in the voice frame that, if lost, will reduce voice quality the least and minimize voice quality degradation. In one implementation, a start up cryptographic sync message can be fit within the voice channel bits that are protected with Forward Error Correction algorithms.

In FIGS. 1-5, the initiating device is denoted with the reference numeral 10, whereas the listening devices are denoted with the reference numerals 10', 10" and 10'".

Exemplary PTT Wireless Communication System

FIG. 1 is a block diagram of a generic PTT wireless communication system 100 that can provide secure communications between two users. This system includes secure devices 10, 10', cellular network infrastructure 20 and a PTT server 30. The PTT wireless communication system 100 is sometimes also referred to as a push-to-talk (PTT) system, a net broadcast service (NBS), a dispatch system; or a point-to-multi-point communication system.

Each device 10, 10' supports the cellular air interface and call/session processing functions as well as a PTT client application compatible with the PTT server 30 used in the network. Each device 10, 10' includes a PTT client that operates in conjunction with the PTT server 30 in order to execute half-duplex service. Each device 10, 10' supports cryptographic algorithms and asymmetric key exchange message processing used to establish a TEK between secure cellular PTT mobile devices. Each device 10, 10' encrypts and decrypts voice per the security association. Each device 10, 10' also formats encrypted voice and cryptographic synchronization maintenance messages within the PTT channel structure used on the cellular air interface.

The cellular infrastructure 20 establishes network traffic channels between the device 10 and the PTT server 30. The cellular infrastructure 20 performs a variety of functions which include, but are not limited to, subscriber access control, mobility management, subscription management, radio resource management, and connection management and call/session processing. In some implementations, the cellular infrastructure 20 generally comprises a radio access network (RAN) and a core network (CN). Examples of such implementations are discussed below with reference to FIGS. 3 and 4.

The PTT server 30 manages the PTT channel half-duplex control mechanism amongst the PTT users, provides call/session processing with PTT clients, and replicates and forwards PIT voice packets to PTT users. The PTT server 30 may be deployed in either a centralized deployment or a regionalized deployment. The manner in which the PTT server 30 is implemented depends on the type of cellular infrastructure 20.

As will be explained in greater detail below with reference to FIGS. 2-5, the present invention can be applied to a wide variety of wireless and wired communication systems some of which are used to implement PTT services. These embodiments include, for example, PTT over voice circuit service channels, PTT over VoIP packet service channels, PTT over iDEN voice dispatch channels and PTT over peer-to-peer networks. Various embodiments of the invention may be incorporated in a wireless communication system operating in accordance with a communication standard outlined and disclosed in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, GSM standard, all of which are incorporated by reference herein in their entirety. Each embodiment of the PTT wireless communication system 100 can be distinguished, for example, based on their different cellular infrastructures 20, traffic channel structures and call/session processing sequences. Nevertheless, it should be appreciated that the present invention applies to each embodiment of the PTT wireless communication system 100.

Figure 2:
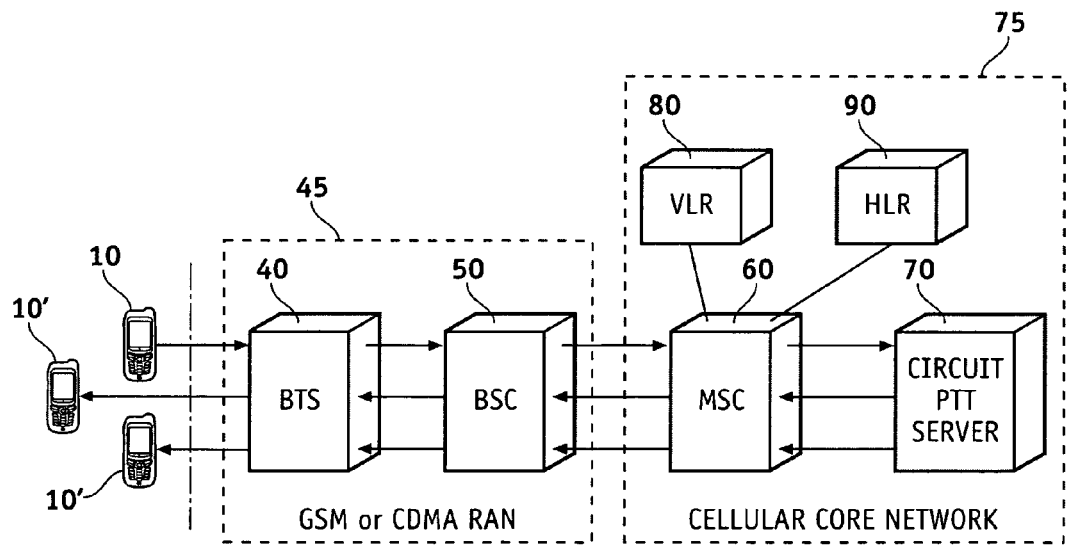
FIG. 2 is a block diagram of a secure push-to-talk (PTT) wireless communication system that carries circuit switched voice traffic between an initiating device and a listening device via circuit switched voice channels.

FIG. 2 is a block diagram of a secure push-to-talk (PTT) wireless communication system which carries circuit switched voice traffic via circuit switched voice channels. The communication system 100 may be for communications of data and voice.

The system shown in FIG. 2 includes circuit-based devices 10, 10', a GSM or CDMA radio access network (RAN) 45, and a circuit-based PTT cellular core network 75. This embodiment would apply to both GSM and CDMA radio access networks (RANs). A CDMA system as referred to herein may include the family of CDMA systems, including CDMA2000, W-CDMA, and IS-95.

The GSM or CDMA radio access network (RAN) 45 includes a collection of base transceiver stations (BTS) 40 and one or more base stations' controllers (BSC) 50. The RAN 45 transports data packets between multiple devices 10. The RAN 45 may be further connected to additional networks outside the RAN 45, such as a corporate intranet or the Internet, and may transport data packets between each device 10 and such outside networks.

The base transceiver station (BTS) 40 provides communication links between a number of devices 10 and a public switched telephone and data network (not shown). It should be noted that the BTS 40 may be referred to as Node B in WCDMA and UMTS systems. Therefore, such terms may be used interchangeably. BTS/Node B 40 may include a number of components, such as a base transceiver system and antenna system. For simplicity, such components are not shown. The term base transceiver station (BTS) 40 is used herein to mean the hardware with which device 10 communicate. Cell refers to the hardware or a geographic coverage area, depending on the context in which the term is used. A sector is a partition of a cell. Because a sector has the attributes of a cell, the teachings described in terms of cells are readily extended to sectors.

The BSC 50 may control various operating aspects of the communication system 100 in relation to communications over a back-haul between the cellular core network 75 and BTS/Node B 40. The BSC 50 may also be referred to as radio network controller (RNC) in various standards.

The device 10 may communicate with one or more BTSs 40 by transmitting and receiving data packets through one or more BTSs 40. A device 10 that has established an active traffic channel connection with one or more BTSs 40 is called an active mobile station, and is said to be in a traffic state. A device 10 that is in the process of establishing an active traffic channel connection with one or more BTSs 40 is said to be in a connection setup state. A device 10 that is powered on and capable of receiving signals from a BTS 40 but is not in a traffic state or in a connection setup state is said to be in an idle state. It should be noted that the PTT phone 10 may be referred to as user equipment (UE). Therefore, such terms may be used interchangeably.

A communication link through which a device 10 sends signals to a BTS 40 is called a reverse link or uplink. The term communication channel/link is used herein to mean a physical channel or a logical channel in accordance with the context. A communication link through which a BTS 40 sends signals to a device 10 is called a forward link or uplink. BTS/Node B 40 may communicate with each device 10 that is in its coverage area via a forward link signal transmitted from BS/Node B 40. The forward link signals targeted for device 10 may be summed to form the forward link signal. Each of the devices 10 receiving the forward link signal decodes the forward link signal to extract its intended received information. BTS/Node B 40 may also communicate with the devices 10 that are in its coverage area via a forward link signal transmitted from BTS/Node B 40. The devices 10 communicate with BTS/Node B 40 via corresponding reverse links. Each reverse link is maintained by a reverse link signal.

Although the reverse link signals may be targeted for one BTS/Node B 40, may also be received at another BTS/Node B 40.

The circuit-based PTT cellular core network 75 includes a Mobile Switching Center (MSC) 60 coupled to a circuit PTT server 70. In addition, a Visitor Location Register (VLR) 80 and a Home Location Register (HLR) 90 are coupled to the MSC 60.

Secure Circuit PTT Voice Call

For secure circuit PTT voice, a device 10 uses GSM or IS-41 call processing to establish circuit voice channels with the circuit PTT server 70. This traffic channel can use either Tandem Free Operation (TFO) or Transcoder Free Operation (TRFO) to preserve cryptographic integrity. The secure devices 10 format encrypted voice and cryptographic synchronization messages within the circuit voice channel, which are then forwarded to the recipient secure device 10 by the circuit PTT server 70. The asymmetric key exchange needed to establish a security association between the devices 10, prior to the secure PTT call, can be accomplished by a number of alternate embodiments as explained below.

Figure 3:
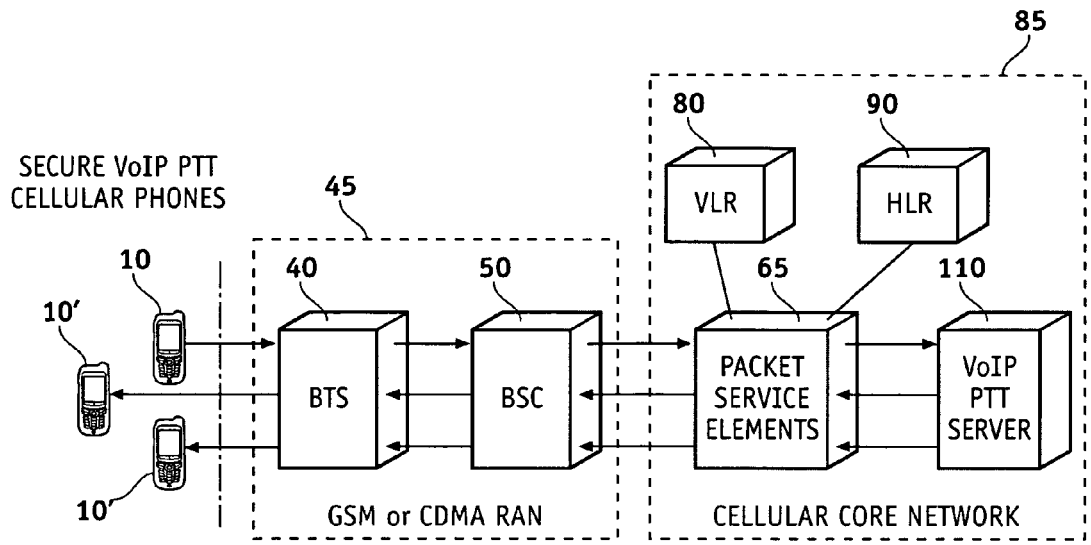
FIG. 3 is a block diagram of a secure PTT wireless communication system that carries packet switched voice traffic between an initiating device and a listening device via packet switched voice-over-IP (VoIP) channels.

FIG. 3 is a block diagram of a secure voice-over-IP (VoIP) PTT wireless communication system that carries packet switched voice traffic via packet switched voice-over-IP (Internet Protocol) of VoIP channels. This embodiment can apply to radio access networks (RANs) and core networks 85 which implement features from GPRS, EDGE, WCDMA, CDMA1X, CDMA EV-DO, CDMA EV-DV standards, as well as the Push to Talk over Cellular (POC) standard as standardized by the Open Mobile Alliance (OMA).

The secure voice-over-IP (VoIP) PTT wireless communication system 100 shown in FIG. 3 includes circuit-based devices 10, 10', a GPRS or CDMA 1x radio access network (RAN) 45, and packet-based PTT cellular core network 85. The circuit-based devices 10 and radio access network (RAN) 45 are similar to those described above in conjunction with FIG. 3. For sake of simplicity these subsystems will not be described again.

In this embodiment, the core network 85 includes packet service elements 65 coupled to a VoIP PTT server 110. In addition, a Visitor Location Register (VLR) 80 and a Home Location Register (HLR) 90 are coupled to the packet service elements 65.

The VoIP PTT server 110 may be implemented as an OMA, 3GPP or 3GPP2 compliant PTT server, or may be implemented as a custom server. Regardless of the implementation, the VoIP PTT server 110 should provide IP address resolution, packet routing functionality and RTP payload replication functionality.

When implemented in a GPRS network, the packet service elements 65 include, for example, a Serving GPRS Service Node (SGSN) and a Gateway GPRS Service Node (GSGN). When implemented in a CDMA 1x network, the packet service elements 65 include, for example, a Packet Data Serving Node (PDSN). For sake of simplicity, a secure voice-over-IP (VoIP) PTT wireless communication system that carries packet switched voice traffic via packet switched voice-over-IP (VoIP) channels will now be described with respect to radio access networks (RANs) and cellular core networks 85 which implement features from a CDMA 1x network.

The devices 10, 10' may request packet data sessions using a data service option. Each device 10, 10' may use the session to register its Internet Protocol (IP) address with a group call server which performs group call initiations. In this embodiment, VoIP PTT server 110 is connected to the service provider's packet data service nodes (PDSNs) through a service provider's wide area network. Upon requesting a packet data session from the infrastructure 20, the devices 10, 10' may have IP connectivity to the VoIP PTT server 110 through a packet data serving node (PDSN). The PDSN provides an interface between transmission of data in the fixed network and the transmission of data over the air interface. Each PDSN may interface to a BSC 50 through a packet control function (PCF) which may be co-located with the BSC 50 within the BTS 40. The PDSN may be in an active or connected state, dormant state, or a null/inactive state. In the active or connected state, an active traffic channel exists between the participating device 10 and the BTS 40 or BSC 50, and either side may send data. In the dormant state, no active traffic channel exists between the participating device 10 and the BSC 50, but a point-to-point (PPP) link is maintained between the participating device 10 and the PDSN. In the null or inactive state, there is no active traffic channel between the participating device 10 and the BSC 50, and no PPP link is maintained between the participating device 10 and the PDSN.

After powering up, the device 10 may request packet data sessions. As part of establishing a packet data session, the device 10 may be assigned an IP address. The device 10 may perform a registration process to notify the PTT server 30 of the device's 10 IP address. Registration may be performed using an IP protocol, such as session initiation protocol (SIP) over user datagram protocol (UDP). The IP address of the device 10 may be used to contact the device 10 when the corresponding user is invited into a group call.

Once a group call is established, devices 10 and the VoIP PTT server 110 may exchange media and signaling messages. In one embodiment, media may be exchanged between the participating devices 10 and the VoIP PTT server 110 by using real-time protocol (RTP) over UDP. The signaling messages may also be exchanged by using a signaling protocol over UDP.

Secure VoIP Cellular PTT Voice Call

For secure VoIP cellular PTT voice, the secure devices 10 uses GPRS or CDMA1x session processing to establish packet traffic channels to the VoIP PTT server 110. The secure devices 10 format encrypted voice and cryptographic synchronization messages within RTP payloads compatible with payload formats of the VoIP PTT server 110. The VoIP PTT server 110 then forwards the RTP payloads to the recipient secure devices 10. These formats accommodate the half-duplex flow control methods employed by the VoIP PTT server 110. An asymmetric key exchange, used to establish a security association between the devices 10 prior to the secure PTT call, can be accomplished by a number of alternate embodiments as explained below.

Figure 4:
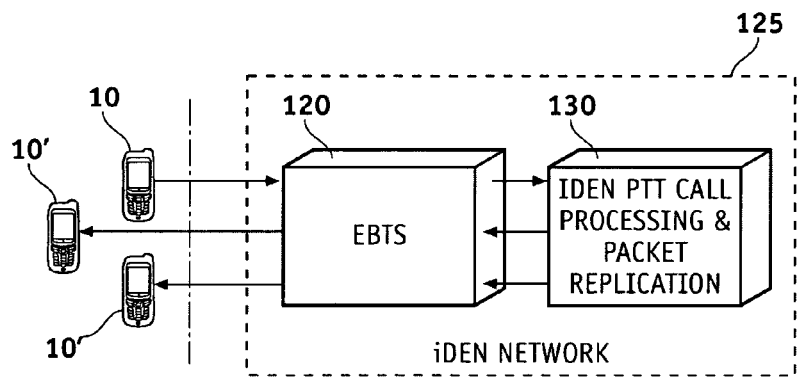
FIG. 4 is a block diagram of a secure PTT wireless communication system that carries voice traffic between an initiating device and a listening device via iDEN dispatch channels.

FIG. 4 is a block diagram of a secure integrated Digital Enhanced Network (iDEN) PTT wireless communication system that carries voice traffic via iDEN voice dispatch channels implemented in iDEN infrastructure networks. The secure iDEN PTT wireless communication system 100 includes secure iDEN PTT phones 10 and an iDEN network 125. The iDEN network 125 includes an Enhanced Base Transceiver Station (EBTS) 120 and an iDEN PTT call processing and packet replication infrastructure 130. The iDEN PTT call processing and packet replication infrastructure 130 is responsible for the overall coordination of Dispatch communication including subscriber provisioning, mobility information, dispatch call setup, routing of voice dispatch packets for point to point service, and packet duplication and routing for Group Call services.

Secure PTT Voice Over iDEN Dispatch Voice Channels

For secure PTT voice over iDEN dispatch voice channels, the secure iDEN PTT phones 10, 10' uses iDEN call processing and network access procedures to establish traffic channels to the iDEN PTT call processing and dispatch packet replication infrastructure 130. The secure iDEN PTT phones 10, 10' format encrypted voice and cryptographic synchronization messages within the iDEN voice dispatch channels. The iDEN PTT call processing and packet replication infrastructure 130 then forwards the encrypted voice packets to the recipient Enhanced Base Transceiver Station (EBTS) and secure iDEN PTT phones 10, 10'. The asymmetric key exchange needed to establish a security association between the secure iDEN PTT phones 10, 10', prior to the secure PTT call, can be accomplished by a number of alternate embodiments as explained below.

Figure 5:
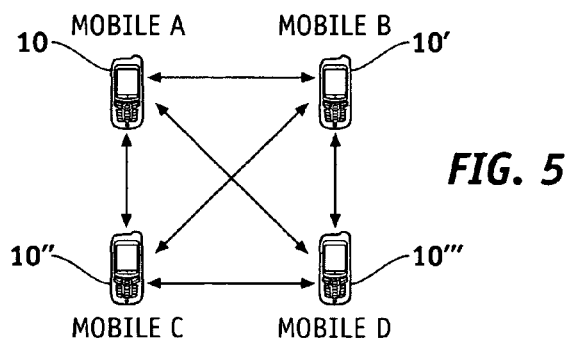
FIG. 5 is a block diagram of a secure PTT wireless communication system that carries voice traffic between an initiating device and a listening device via dispatch channels in a peer-to-peer network.

FIG. 5 is a block diagram of a secure peer-to-peer PTT wireless communication system that carries voice traffic via dispatch channels in the absence of cellular infrastructure. Peer-to-peer networks such as iDEN MotoTalk feature, peer-to-peer wireless LANs, and Mobile Ad-Hoc Networks (MA-NETs) do not use a cellular infrastructure. Rather, in these systems, each PTT phone 10 communicates directly with other PTT phones 10', 10", 10'''. Each PTT phone 10 has access to a common air interface which exists within the range of other PTT phones 10', 10", 10'''. Since there is no infrastructure providing master timing, each peer to peer transmission contains all of the necessary synchronization and timing information. Such peer to peer systems may also use techniques such as frequency hoping to enhance detection and increase eavesdropping resistance. Collision avoidance techniques are required since any PTT phone 10 may transmit over the air interface simultaneously with other PTT phones 10', 10", 10'''. Furthermore, multiple PTT phones 10, 10', 10", 10''' may detect received traffic from a transmitter even if it is not specifically addressed to that PTT phone 10, 10', 10", 10'''. As such, each PTT phone 10, 10', 10", 10''' mutes/ignores all traffic on the channel that is not addressed to its address. An asymmetric key exchange can be applied to the common air interface channel by two PTT phones 10, 10', 10", 10''' intending to establish a TEK for a subsequent secure point-to-point PTT call. CSE via a shared secret by the two PTT phones 10, 10', 10", 10''' is required for authentication and also to prevent man in the middle attacks by other PTT phones 10, 10', 10", 10''' that are also active on the common air interface. Once the TEK is cached, then point-to-point secure PTT voice call can commence.

Each cellular embodiment described above uses a unique PTT channel structure. Therefore, a distinct formatting function is used by the secure devices 10, 10' based upon the cellular network types illustrated in FIGS. 1-5. Nevertheless, the embodiments of the invention can be applied, for example, to all the PTT embodiments discussed above with respect to FIGS. 1-5. It should also be appreciated that the secured packets pass through the cellular infrastructure to the PTT servers transparent to the mobile network. For example, in the GSM type networks, Transcoder Free Operation (TFO) or TrFO features would be used, whereas in CDMA type networks a transcoder free feature would be used for secure circuit voice channels.

Exemplary Embodiments

Figure 6:
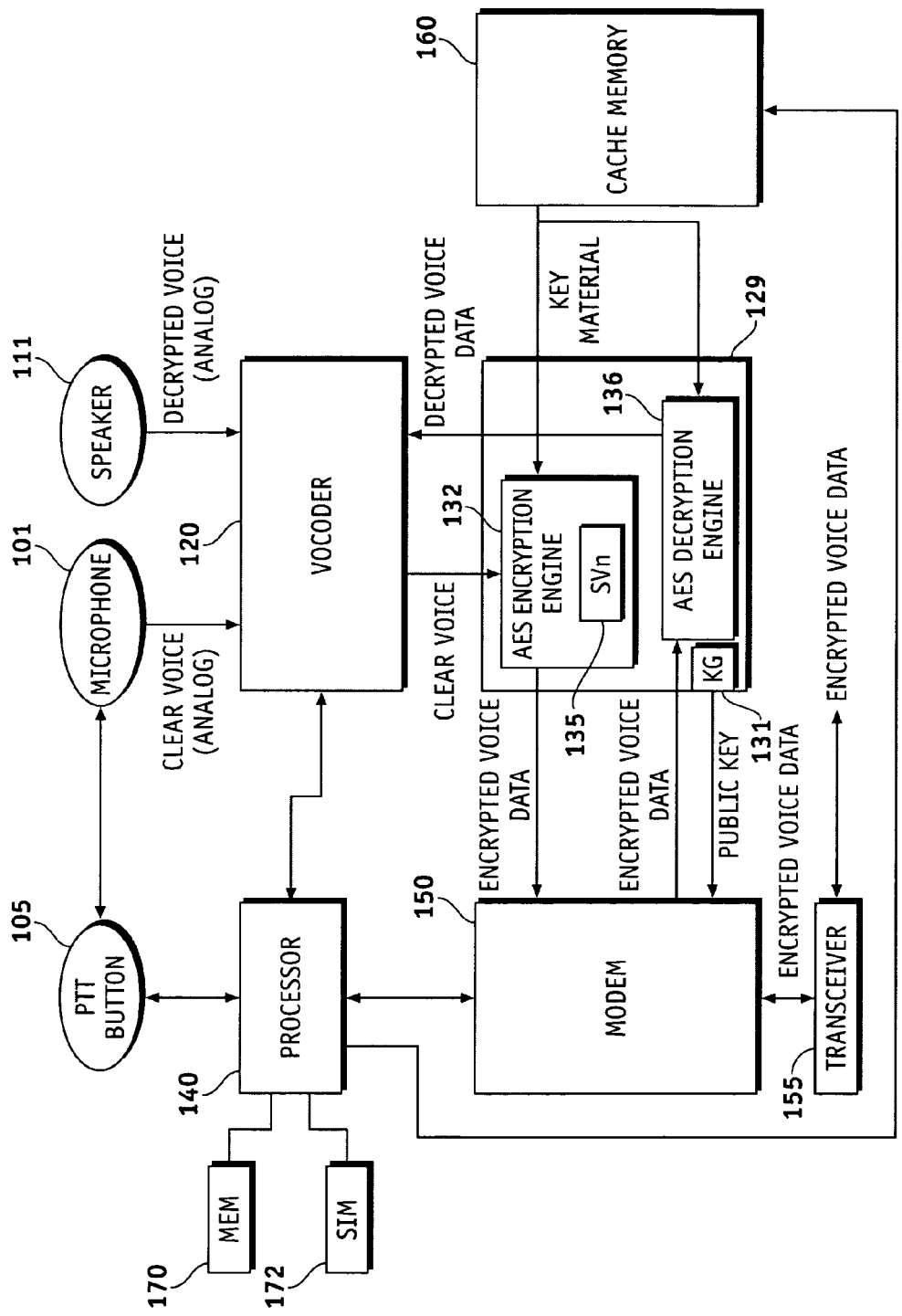
FIG. 6 is a block diagram of an exemplary wireless device that can be used in the communication systems of FIGS. 1-5.

FIG. 6 is a block diagram of a wireless device that can be used in the communication systems of FIGS. 1-5. In FIGS. 1-5, the initiating device is denoted with the reference numeral 10, whereas the listening devices are denoted with the reference numerals 10', 10" and 10'''.

The wireless device 10, 10' shown in FIG. 6 can be an initiator or listener in a secure wireless Push-to-Talk (PTT) dispatch system. To illustrate how the wireless device would work in the context of a secure PTT dispatch system, in the description that follows, these different initiating and listening functionalities of the wireless device will be described with respect to an initiating device 10 and a listening device 10'. It should be appreciated, however, that the wireless device 10 of FIG. 7 includes all of the functionality of both the initiating device 10 and the listening device 10'. It should also be appreciated that the initiating device 10 and the listening device 10' comprise the same elements, but that only the elements in the initiating device 10 and the listening device 10' which interact on each side of a secure communication will be described.

The initiating device 10 includes, for example, a microphone 102, a PTT button 105, a speaker 111, a vocoder 120, a security subsystem 129, a processor 140, a modem 150, a first transceiver 155, a first cache memory 160, a memory 170 and a Subscriber Identity Module (SIM) 172. The security subsystem 129 comprises a key generator 131, an encryption engine 132 which includes a state vector generation unit with a synchronization message generator (not shown), and a decryption engine 136. The listening device 10' comprises the same elements as the initiating device 10. In the description that follows, to distinguish the initiating device 10 from the listening device 10', the decryption engine of the listening device 10' will be described as a second decryption engine 136', the transceiver of the listening device 10' will be described as a second transceiver 155', and the cache memory will be described as a second cache memory 160' although these components are actually implemented in the decryption engine 136, the first transceiver 155 and the first cache memory 160. The first and second transceivers 155, 155' each comprise a transmitter subsystem and a receiver subsystem (not shown).

The microphone 101 is coupled to the PTT button 105 and the vocoder 120. The PTT button 105 is also coupled to the processor 140. The speaker 111 is coupled to the vocoder 120. The vocoder 120 is coupled to the processor 140, and the encryption engine 132 and the decryption engine 136 of the security subsystem 129. The security subsystem 129 is coupled to the modem 150 and the cache memory 160. The processor 140 is coupled to the vocoder 120, the modem 150 and the cache memory 160. The cache memory 160, 160' is coupled to the encryption engine 132 and the decryption engine 136 of the security subsystem 129. The memory 170 and the Subscriber Identity Module (SIM) 172 are coupled to the processor 140. The modem 150 is coupled to the transceiver 155, 155'.

To begin a secure PTT call, the user of the initiating device 10 pushes the PTT button 105 to request permission to speak. When the user pushes the PTT button 105, the processor 140 generates a PTT service request message that is sent to the network via the transmitter subsystem in the first transceiver 155. If the network decides to grant the user's service request, the network sends a grant message that is received by a receiver in the transceiver 155. The processor 140 processes the grant message and can send an audible tone to the speaker 111 which lets the user know that the floor has been granted.

The user speaks into the microphone 101. The microphone 101 converts the user's voice into an analog signal representing the user's voice, and sends this analog signal to the vocoder 120. The vocoder 120 receives an analog voice signal from the user of the initiating device, via the microphone 101, and generates clear voice packets from the voice signal. These voice packets are sent to the encryption engine 132.

How the call set up proceeds from this point depends on whether the initiating device 10 has previously established a security association with the listening device 10'. The processor 140 determines if the initiating device 10 has previously established a security association with the listening device 10' by checking the cache memory 160 to determine if a security association is available. If a security association for the listening device 10' has already been negotiated and stored, then the initiating device 10 uses the stored security association to begin a secure session. This process will be described in detail below. By contrast, if a security association is not available, then the secure PTT service request also triggers an asymmetric key exchange to establish an initial security association, as will now be described in detail.

Establishment of the Initial Security Association

A security association for a first secure session between the initiating device 10 and a listening device 10' can be generated by exchanging asymmetric key exchange (AKE) messages.

In one embodiment, this security association for a first session can be established via an AKE over, for example, a reliable network transport service. Examples of the reliable network transport service can include, for example, a reliable signaling plane network services, such as GSM Unrestricted Supplementary Service Data (USSD), Packet cellular IP service, a reliable security application over UDP/IP or TCP/IP, a reliable security application over short message service and enhanced short message service, a reliable security application over multi-media message or instant messaging services, a mobile to mobile full duplex circuit data calls, or voice payloads which carry a reliable transport.

In another embodiment, instead of using the reliable network transport service discussed above, this security association for the first session can be established via an AKE over, for example, a point-to-point, half-duplex PTT voice channel by packing the data exchanged during the AKE into voice frames. The data exchanged during the AKE can be formatted differently to get highly protected data through instead of putting it into voice frames. The data exchanged can be packaged into the structure used for the voice frames so that it fits within the PTT voice frame structures on any one of the PTT voice channels illustrated in FIGS. 2-5. The voice frames can be replaced with highly protected data frames, but to the network these specially formatted data frames are treated as regular voice frames. These data frames can be transmitted over the same half-duplex PTT voice channel. This type of AKE helps ensure reliability via error correction and retransmission used on the half-duplex PTT voice channel.

As will now be described, regardless of the method by which the AKE takes place, the AKE process is basically the same.

Figure 7:
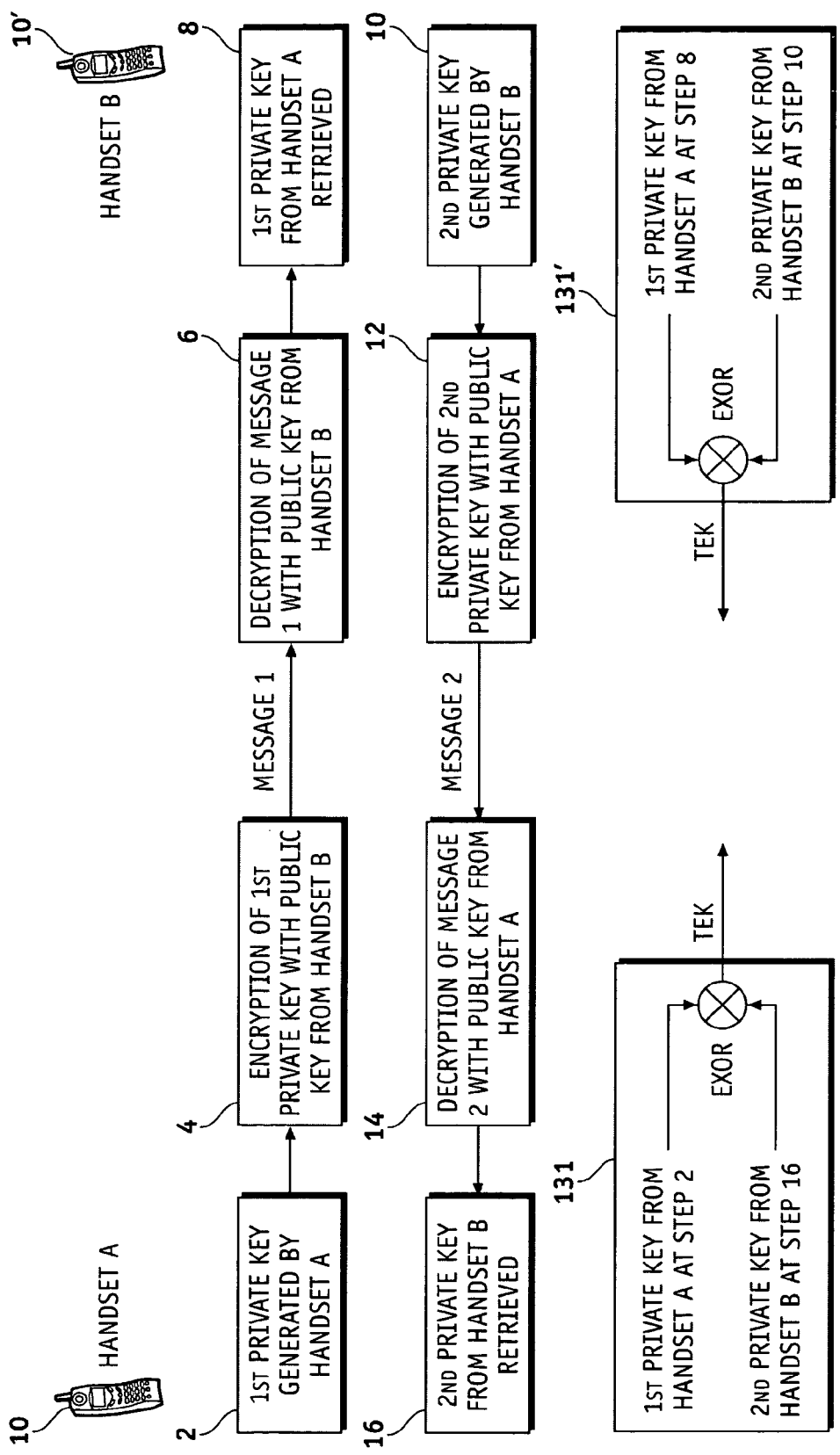
FIG. 7 is a call flow diagram which illustrates an exemplary process for generating a Traffic Encryption Key (TEK) used for secure communications between an initiating device and a listening device.

FIG. 7 is a call flow diagram which illustrates an exemplary process for generating a Traffic Encryption Key (TEK) used for secure communications between an initiating device 10 and a listening device 10'.

Each of the devices 10, 10' randomly generate a public key and a private key. The private key is typically generated by a random number generator in the device 10, 10'. For example, the key generation unit 131 can generate a first public/private key pair in the initiating device 10, and another key generation unit 131 in the listening device 10' can generate a second public/private key pair. Both devices 10, 10' allow everyone access to their public key.

At step 2, initiating device 10 generates a first symmetric key to send to listening device 10'. At step 4, initiating device 10 encrypts the first symmetric key using an appropriate asymmetric algorithm and the second public key generated by listening device 10'. The initiating device 10 then sends the resulting message 1 to listening device 10'. At step 6, using its own second private key, the listening device 10' decrypts message 1 received from listening device 10'. At step 8, the first symmetric key from initiating device 10 can be retrieved by the listening device 10'. At step 10, the listening device 10' generates a second symmetric key to send to the initiating device 10. At step 12, the listening device 10' encrypts the second symmetric key using an appropriate asymmetric algorithm and the first public key generated by initiating device 10. The listening device 10' then sends message 2 to listening device 10'. At step 14, using its own first private key, the initiating device 10 decrypts message 2 received from the listening device 10', and at step 16, the second symmetric key from listening device 10' can be retrieved.

The initiating device 10 and the listening device 10' both use the first public key and the second public key to generate the initial security association for the first session. For example, the initiating device 10 can generate a TEK by exclusively or-ing (EXOR) the first symmetric key generated by the initiating device 10 with the second symmetric key from a listening device 10 that has been retrieved by the initiating device 10. Similarly, the listening device 10' generates an identical TEK by exclusively or-ing (EXOR) the second symmetric key generated by the listening device 10' with the first symmetric key generated by the initiating device 10 that has been retrieved by the listening device 10'.

In an alternative embodiment, CSE may be applied to the AKE to provide for user authentication between the initiating device 10 and the listening device 10'. In this case, a shared secret (such as an ID hard-coded into the phone) known between the initiating device 10 and the listening device 10' can be used to encrypt the asymmetric message set that is used to establish the TEK. This can allow a user to know which other wireless devices can be trusted so long as they have the shared secret stored in their wireless device.

Referring again to FIG. 6, the stored security association comprises the traffic encryption key (TEK) and a first state vector. The first cache memory 160 of the initiating device 10 is configured to store the TEK. The initiating device 10 associates the shared symmetric key or TEK with the listening device 10'. The second cache memory 160' of the listening device 10' also stores the TEK. The listening device 10' can associate this shared symmetric key or TEK with the initiating device 10. The shared symmetric key or TEK can then be used during a subsequent secure session between the initiating device 10 in the listening device 10' to encrypt and decrypt voice packets.

In an alternative embodiment, a Subscriber Identity Module (SIM) can be used to store the security associations. By storing the security association parameters on the SIM, a security association can be linked to a mobile network subscription rather than the wireless device. As such, the user can transfer the SIM and stored security associations between different devices the user uses. The user can continually upgrade/replace their phone and not disrupt or change the security associations as long as the same SIM is used in each device. The security parameters are transparent to the mobile network subscription and infrastructure, but the user can reference or apply the security association to mobile subscription characteristics (MS ISDNs, for example). This can improve security association portability.

Figure 8:
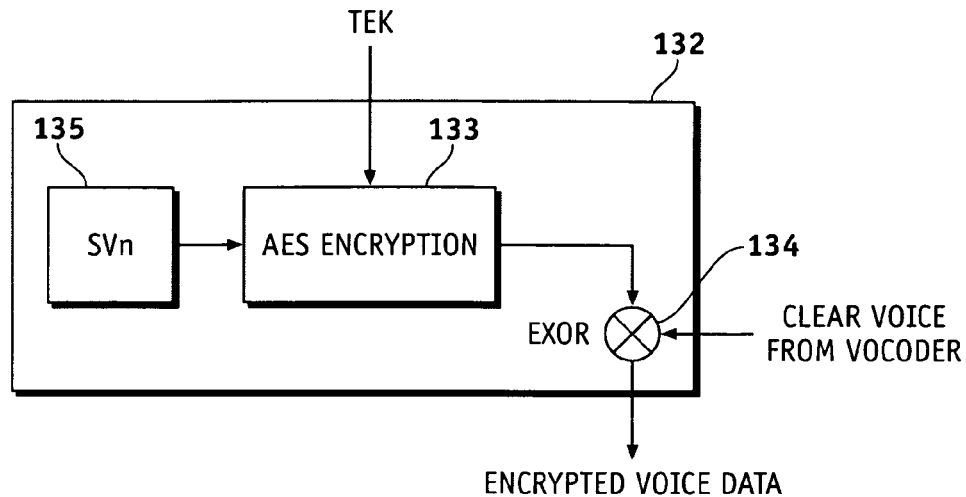
FIG. 8 is a block diagram of an exemplary embodiment of the encryption engine of the security subsystem of FIG. 6.

FIG. 8 is a block diagram of one embodiment of the encryption engine 132 of the security subsystem 129 of FIG. 6. The encryption engine 132 is configured to use the cached security association stored in the cache memory 160 and an updated state vector to encrypt the voice packets.

The encryption engine 132 comprises a state vector generator 135, an encryption unit 133 and an exclusive OR function (EXOR) 134.

When the initiating device 10 wants to speak, the initiating device 10 must continually let the listening device 10' know where to begin decrypting their voice signal. The state vector generator 135 generates an updated state vector comprising a synchronization message for maintaining secure call synchronization. The state vector generator 135 allows initiating device 10 to encrypt their voice uniquely using their own unique state vector which is distributed at the beginning of and during transmission of voice traffic. The state vector generator 135 generates the state vector based on something unique to the initiating device 10 (e.g., a SIM card ID, a serial number ID, or other ID). In one implementation, the lower bits of the state vector can be set to zero and the upper bits set to the 10's serial number. Thus, when initiating device 10 depresses his PTT button to become the talker, initiating device 10 communicates his current state vector to the listening device 10'. The state vector is continuously updated each time the initiating device 10 depresses their PTT button.

In one embodiment, not shown in the drawings, the state vector generator 135 comprises a synchronization message generator which can be configured to generate the synchronization message. Because the state vector is unique, the initiating device 10 sends the synchronization message before dispatching an encrypted voice signal. The synchronization message lets the listening device 10' know what the start value of the state vector is so that the listening device 10' knows when to begin decrypting the encrypted voice signal by using the TEK. The initiating device 10 then sends the listening device 10' their unique state vector and then transmits the encrypted voice signal.

The encryption unit 133 receives the TEK from the cache memory 160 and the updated state vector generated by the state vector generator 135. Both initiating device 10 and listening device 10' have the same TEK. When the unique state vector is loaded into an encryption unit 133, a counter in the state vector is incremented by one to get each new voice frame. The encryption unit 133 encrypts these inputs to generate an encrypted state vector comprising the TEK and the updated state vector.

The exclusive OR function (EXOR) 134 receives the encrypted state vector from the encryption unit 133 and combines the encrypted state vector with clear voice packets received from the vocoder 120 to generate an encrypted voice stream comprising encrypted voice frames. Each of the encrypted voice frame comprises encrypted voice packet(s). The encryption engine 133 can also include a synchronization message insertion unit (not shown) which can be configured to periodically or randomly replace partially or completely at least one of the encrypted voice packets of an encrypted voice frame with the synchronization message. In one embodiment, the encrypted voice packets which are replaced by the synchronization message comprise encrypted voice packets that have only their least significant bits replaced by the synchronization message. In another embodiment, the encrypted voice packets and synchronization messages can be formatted to fit within the half-duplex PTT voice channel.

The modem 150 is configured to format the encrypted voice packets to fit within the half-duplex PTT voice channel. The transmitter in transceiver 155 is configured to transmit the encrypted/formatted voice packets and the synchronization message(s) to the transceiver 155' over the half-duplex PTT voice channel. In one embodiment, the voice frames can be protected by a Forward Error Correction code.

The transceiver 155' of the listening device 10' receives the encrypted/formatted voice packets with the synchronization message(s) from the transceiver 155 over the half-duplex PTT voice channel. The transceiver 155' sends the encrypted/formatted voice packets with the synchronization message(s) to the modem 150 where they are unformatted and sent to the decryption engine 136' as encrypted voice.

The listening device 10' can then use the cached security association and the current state vector to decrypt the encrypted voice packets received from the initiating device 10. The decryption engine 136' can use the cached TEK and the updated state vector to decrypt the encrypted voice packets. The decryption engine 136' uses the synchronization message to initialize cryptographic synchronization at the start of a secure voice frame to thereby compensate for any voice packets lost or gained during transmission.

Figure 9:
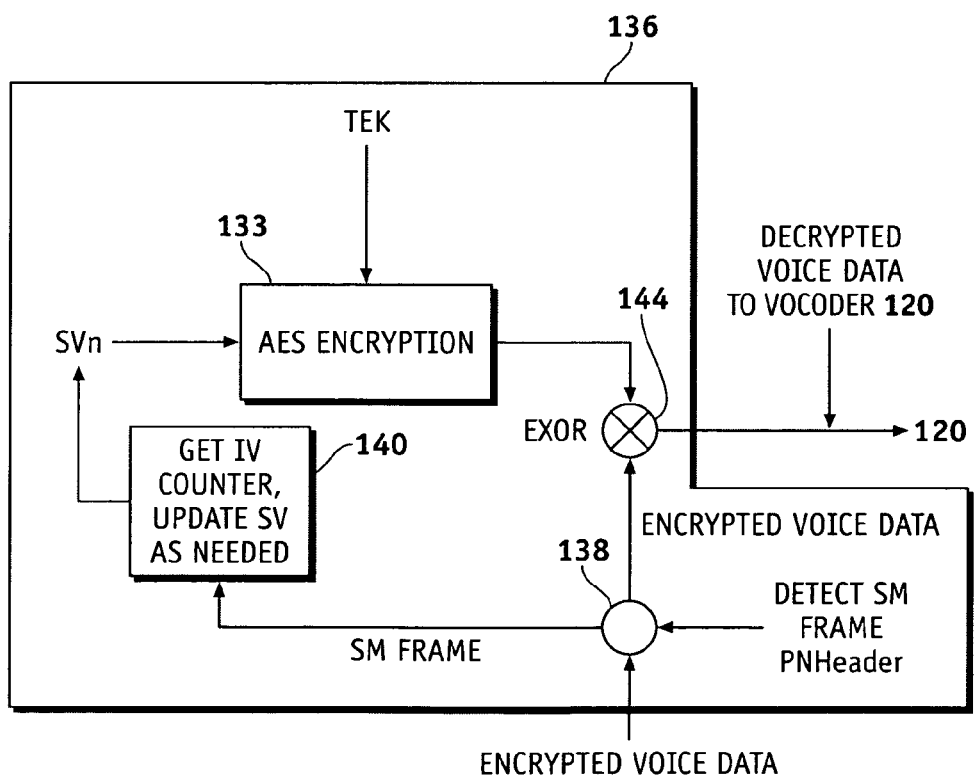
FIG. 9 is a block diagram of an exemplary embodiment of a decryption engine of the security subsystem of FIG. 6.

FIG. 9 is a block diagram of one embodiment of a decryption engine 136 of the security subsystem 129 of FIG. 6. The decryption engine 136 comprises an encryption unit 133, a synchronization message detector 138, a counter 140, and an exclusive OR function (EXOR) 144.

The synchronization message detector 138 is coupled to the counter 140 and the exclusive OR function (EXOR) 144. The counter 140 is coupled to the encryption unit 133. The encryption unit 133 is coupled to the exclusive OR function (EXOR) 144. The exclusive OR function (EXOR) 144 is coupled to the vocoder 120.

The synchronization message detector 138 receives encrypted voice packets from the modem 150 and an input which detects a synchronization message frame pseudorandom number (PN) header. The input which detects a synchronization message frame PN header, when combined with the encrypted voice packets, generates a synchronization message frame number which can then be passed on to the counter 140. The synchronization message detector 138 passes the encrypted voice packets to the exclusive OR function (EXOR) 144 without modification.

If the state vector began at the same count each time, then the same key stream would be generated in all sessions, which would not work well as a cryptographic system since it would be very predictable. Each handset has a State Vector that includes both an ID value unique to the handset and a counter 140 that counts forward and never repeats old counter values. Each transmit State Vector is unique because it is based in part on a unique ID associated with each handset. The counter 140 increments with each frame of traffic and is included in the updated state vector which is passed to the encryption unit 133. The counter 140 of the state vector ensures that the counter begins at a different value in each session so that the key stream generated in each session is different and does not repeat old counter values.

The encryption unit 133 obtains the previously established security association associated with the initiating device 10 from the cache memory 160' of the listening device 10'. The encryption unit 133 uses the updated state vector and the TEK to generate a key stream that allows the encrypted voice packets to be decrypted. The key stream is identical to the encrypted state vector generated by the initiating device 10.

The exclusive OR function (EXOR) 144 combines the encrypted state vector and the encrypted voice packets by performing an exclusive or operation on these inputs to generate decrypted or unencrypted voice packets which can then be sent to the vocoder 120.

The vocoder 120 replaces the start-up synchronization messages in the decrypted voice packets with silence. The vocoder 120 uses the decrypted voice packets to generate an analog voice signal which it sends to the speaker 111 where it can be heard by the user of the listening device 10'.

Although not shown, the memory 170 can store information that can be used to provide a number of features such as a secure PTT call phone book directory and an address book. These features can be used in conjunction with embodiments of the invention to provide a number of enhanced functions. For instance, in some embodiments, symmetric keys can be negotiated in advance instead of on-demand to separate call-set up state from the traffic state.

In another embodiment, the memory 170 of the initiating device 10 can also include an address book. An AKE can be initiated in advance of a subsequent secure PTT call when the initiating device 10 selects the listening device 10' listed in the address book and designates the listening device 10' as being authorized to receive secure messages or secure PTT calls from the initiating device 10. In this case, the initiating device 10 can call the listening device 10' while the initiating device 10 is idle to establish the security association via the AKE before initiating the subsequent secure PTT call. In other words, the user's wireless device performs an AKE in the background while the device is idle so that the symmetric key is already in place when the user goes to make a call to the other party.

The initiating device 10 can also include a secure PTT call phone book directory maintained in memory 170. The AKE can be initiated in advance of a subsequent secure PTT call, for example, when a client number/identifier of the listening device 10' is entered in the secure PTT call phone book directory. The listening device 10' can also include a secure PTT call phone book directory.

In other embodiments, alternate network services can be used to update security associations when the wireless device is in an idle state in advance of a subsequent secure PTT call. For instance, non-voice network services, such as network signaling or IP network transport, can be used to establish a security association for subsequent secure voice channels when the initiating device 10 is in an idle state. This produces an improvement in secure call set up time.

According to another alternative embodiment, to extend time between updating TEKs, the cached TEKs can be deterministically updated prior to use in a future call. In this alternate embodiment, the cached TEKs can be deterministically updated by simultaneously running an algorithm in both the initiating device 10 and the listening device 10' to update the cached TEK and compute a new TEK. The updates can be event-based or timer-based. For example, the event-based update might use a shared event between the initiating device 10 and the listening device 10' could be utilized such that the cached TEK is updated when the initiating device 10 and the listening device 10' speak with each other. Alternatively, the timer-based update could be timer based using a trusted clock or counter that is synchronized between the initiating device 10 and the listening device 10'. The new TEK, derived from cached TEKs, may be calculated and applied to PTT upon every new PTT call, or whenever the exiting cached TEK has reached a maximum use threshold set by security policy. By calculating a new TEK, secure PTT call set up times can be further improved.

Figure 10:
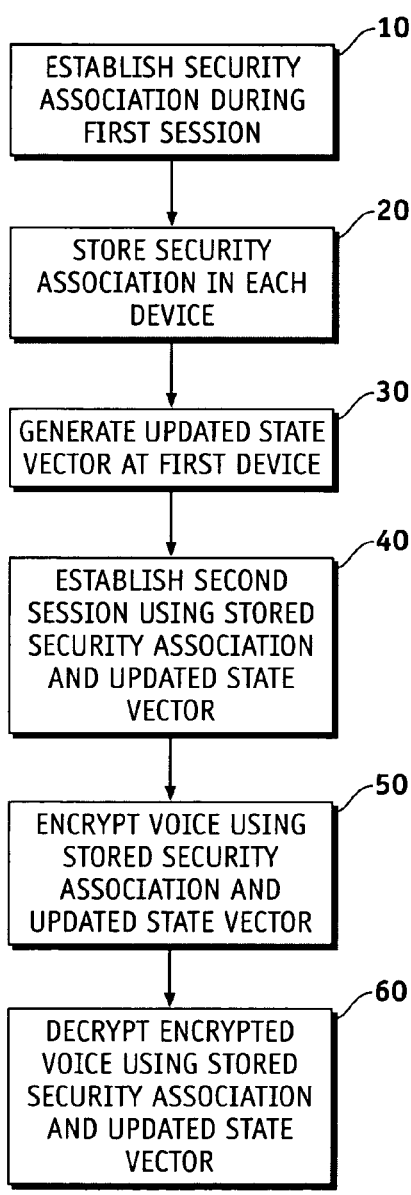
FIG. 10 is a flowchart illustrating an exemplary secure communication method for a half-duplex wireless dispatch system including an initiating device and a listening device.

FIG. 10 is a flowchart illustrating a secure communication method for a half-duplex wireless dispatch system. The system can include an initiating device 10 which communicates with a listening device 10' over a half-duplex PTT voice channel.

At step 10, responsive to a first secure call request from the initiating device 10, a security association can be established during a first session between the devices via an AKE. The security association comprises a traffic encryption key (TEK) and a first state vector. The TEK comprises a shared, secret symmetric key.

Figure 11:
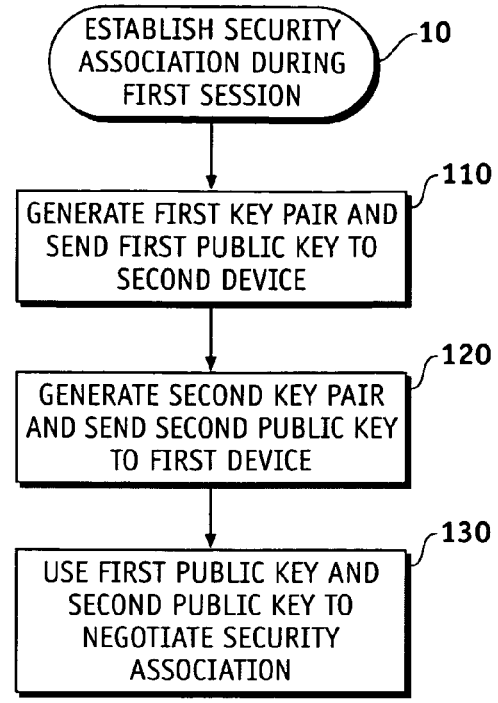
FIG. 11 is a flow chart showing an exemplary method of establishing a security association between an initiating device and a listening device via an asymmetric key exchange messages.

FIG. 11 is a flow chart showing an exemplary method of establishing a security association between the devices via an AKE messages. At step 110, a first public/private key pair is generated at the initiating device 10 and the first public key can be sent to the listening device 10' over a network transport service. At step 120, a second public/private key pair can be generated at the listening device 10' and the second public key can be sent to the initiating device 10 over the network transport service. At step 130, the first public key and the second public key can be used to create the security association as discussed above.

Returning now to FIG. 10, at step 20, the security association is stored in each of the devices for use during a second session between the devices to expedite security association establishment during call set-up of the second session. In one embodiment, the TEK is stored in a cache memory in each of the devices for use during a second session between the devices. The security association is associated with the listening device 10' in the initiating device 10, and the security association is associated with the initiating device 10 in the listening device 10'. At step 30, an updated state vector can be generated at the initiating device 10.

Figure 12:
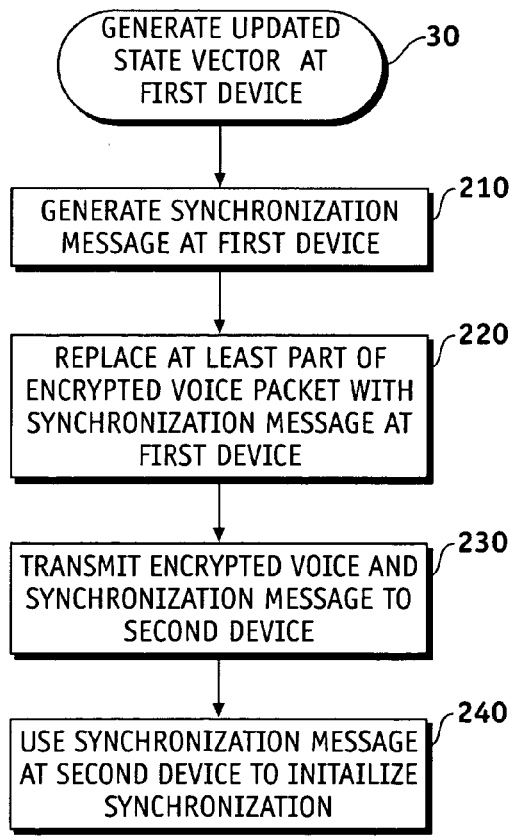
FIG. 12 is a flowchart showing an exemplary method of using a synchronization message of an updated state vector at a listening device to initialize cryptographic synchronization at the start of a secure voice frame.

FIG. 12 is a flowchart showing a method of using a synchronization message of the updated state vector at the listening device 10' to initialize cryptographic synchronization at the start of the secure voice frame. The updated state vector comprises a synchronization message. At step 210, the synchronization message for maintaining secure call synchronization is generated. At step 220, at least one of the encrypted voice packets of an encrypted voice frame being sent from the initiating device 10 to the listening device 10' is replaced with the synchronization message. In one embodiment, the voice frame is protected by a Forward Error Correction code. In another embodiment, the encrypted voice packets being replaced comprise encrypted voice packets that include the least significant bits of the encrypted voice frame, and wherein the encrypted voice packets and synchronization messages are formatted to fit within the half-duplex PTT voice channel. At step 230, the encrypted voice packets and the synchronization message can be transmitted to the listening device 10' over the half-duplex PTT voice channel. At step 240, the encrypted voice packets and the synchronization message from the initiating device 10 are received over the half-duplex PTT voice channel, and the synchronization message is used at the listening device 10' to initialize cryptographic synchronization at the start of the secure voice frame and thereby compensate for any voice packets lost or gained during transmission.

Returning now to FIG. 10, at step 40, responsive to a second secure call request from the initiating device 10, a second session can be established between the initiating device 10 in the listening device 10' by using the cached TEKs and the updated state vector to establish the second session during call set-up of the second session. At step 50, the security association can be used to encrypt voice packets being sent from the initiating device 10 over the half-duplex PTT voice channel to the listening device 10'. At step 60, the security association can be used to decrypt voice packets received by the listening device 10' from the initiating device 10.

Figure 13:
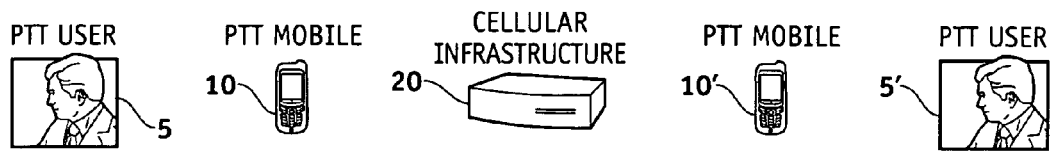
FIG. 13 is a call flow diagram which illustrates an exemplary process for establishing and caching a security association at an initiating device and a listening device, and using the cached security associations to provide a secure call with an expedited call set-up sequence.
Figure 13:
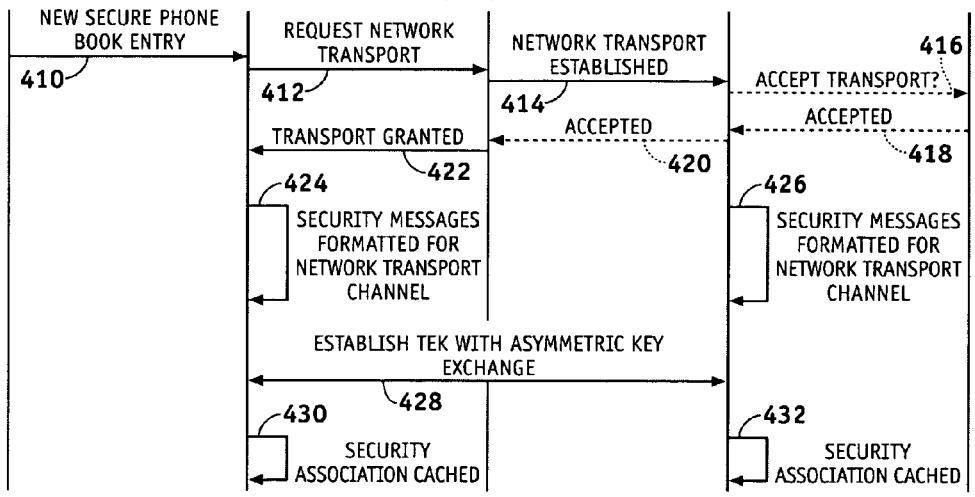
Figure 13:
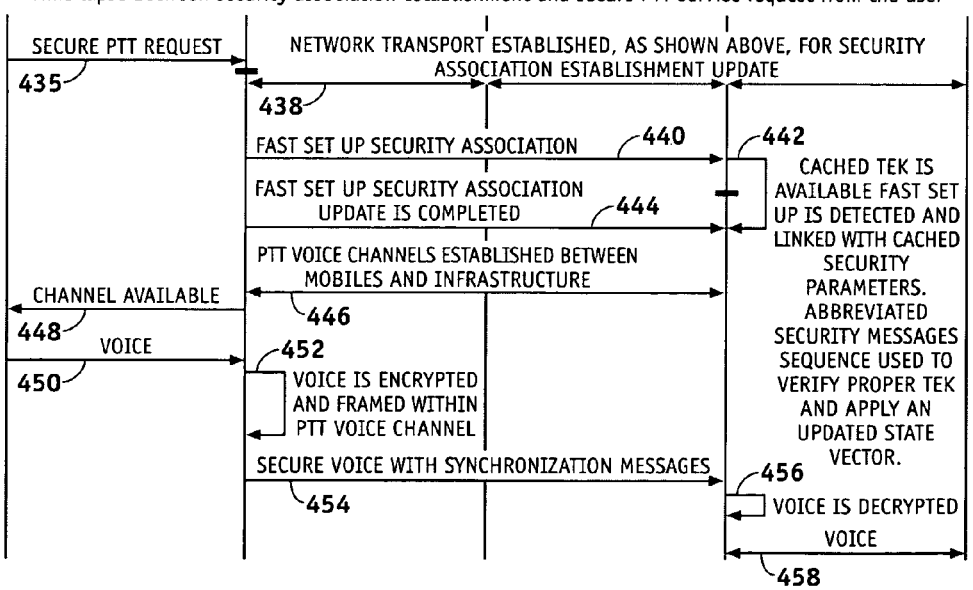

FIG. 13 is a call flow diagram which illustrates a process for establishing and caching a security association, and using the cached security associations to provide a secure call with an expedited call set-up sequence.

When talking to a new person, a full AKE process can be initiated to a new TEK in response to a fast secure call set up received with an unknown TEK. In other words, if the TEK is sent and the listening device 10' does not have the specified TEK, then the initiating device 10 initiates a full AKE sequence.

In one embodiment, a secure PTT call request by the initiating device 10 triggers the AKE. In another embodiment, described above, the AKE may be initiated in advance of a PTT call when the user enters a secure PTT recipient client number/identifier in a secure PTT call phone book directory. At step 410, a talker 5 enters a new secure phone book entry into the initiating device 10. At step 412, the initiating device 10 send a request to cellular infrastructure 20 for a reliable network transport service. At step 414, the cellular infrastructure 20 establishes reliable network transport with the listening device 10'. At step 416, the listening device 10' may optionally ask a listener 5' if they accept the network transport. At step 418, the listener 5' may optionally indicate that he accepts the network transport, and at step 420, the listening device 10' communicates this acceptance to the cellular infrastructure 20. Steps 416-420 are optional since some PTT systems, such as the iDEN PTT system, have a "barge" call feature in which the network transport is automatically accepted and no user confirmation is necessary.

At step 422, the cellular infrastructure 20 grants transport to the initiating device 10. At steps 424 and 426, the initiating device 10 and the listening device 10' format security messages for the network transport channel. From here, this process can then be organized into three sub-processes.

The first sub-process includes techniques of using AKE messages to establish a security association between two devices. At step 428, the listening device 10' and the initiating device 10 establish a TEK via an AKE. The AKE used to establish the TEK can be accomplished using any of the techniques described above to carry the security association establishment messages.

TEK is Cached for Future Secure PTT Calls

In the second sub-process, shown at steps 430 and 432, the security association is cached for future secure calls by the initiating device 10 and the listening device 10'. The cached security associations can help provide a rapid secure set up sequence in a subsequent secure PTT call by allowing for shortened and fast secure message set up sequences. A subsequent secure call can then start with the cached TEK and an appended, updated state vector for cryptographic synchronization. This method requires less secure set up data transfer and results in a rapid secure call set up time. The rapid call set up can also verify that the initiating device 10 and the listening device 10' possess and are using the proper TEK and cryptographic algorithm.

Cached TEK is Applied to Voice Packets in a Secure PTT Call.

After a time lapse, at step 434, between establishing the security association during the first session, the third sub-process begins which uses the security association to encrypt/decrypt voice packets and format them within half-duplex PTT channel structures.

At step 435, the initiator 5 enters a secure group PTT call request. Steps 410-422 described above are repeated at steps 436-438. For sake of simplicity, these steps will not be described here again. At step 440, the initiating device 10 communicates to the listening device 10' that a fast set up will be used to establish the security association for this call. At step 442, the initiating device 10' detects that fast set up will be used and determines whether the cached TEK associated with the initiating device 10 is available. The listening device 10' can send abbreviated security messages to the initiating device 10 to verify that this is the proper TEK and apply an updated state vector. At step 444, the security association update is completed for the fast set up. At step 446, secure PTT voice channels are established between the initiating device 10 and the listening device 10' by the cellular infrastructure 20. At step 448, the initiating device 10 lets the talker 5 know that the secure PTT voice channel has been established and is available. At step 450, the talker 5 speaks into the initiating device 10.

At step 452, the initiating device 10 encrypts the talker's 5 voice frames to fit within the PTT voice channel. A start-up cryptographic synchronization message is adapted to fit within the voice channel bits of voice frames which are protected with Forward Error Correction algorithms. This synchronization message helps initialize cryptographic synchronization at the start of the secure voice. The cryptographic synchronization messages are applied to the half-duplex PTT channel structures to maintain secure call synchronization. After the TEK and cryptographic synchronization are established over the reliable network methods listed above, the encrypted voice and periodic cryptographic synchronization messages are formatted to fit within the PTT cellular network traffic channel. During secure voice, periodic cryptographic sync messages are adapted to use the least important bits of a voice channel to reduce voice degradation while maintaining cryptographic synchronization throughout the remainder of the secure PTT call. This completes the secure PTT traffic channel.

At step 454, the initiating device 10 sends the secure voice with the synchronization messages to the listening device 10'. At step 456, the listening device 10' decrypts the secure voice as discussed above. At step 458, the listening device 10' sends the unencrypted voice to the listener's 5' speaker.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

What is claimed is:

1. A secure device, comprising:
   a vocoder configured to generate voice packets from a voice signal;
   a memory configured to store a previously established security association from a first session between the secure device and another secure device, wherein the stored security association comprises an encryption key and a first state vector, wherein the stored security association is adapted to be used during a second session between the secure device and the other secure device;
   a vector generator configured to generate an updated state vector comprising a synchronization message for maintaining secure call synchronization, wherein the vector generator comprises: a synchronization message generator configured to generate the synchronization message;
   an encryption engine configured to use the stored security association and the updated state vector to encrypt the voice packets;
   a modem configured to format the encrypted voice packets to fit within a half-duplex PTT voice channel, wherein the modem comprises: a synchronization message insertion unit configured to replace at least part of at least one of the encrypted voice packets of an encrypted voice frame being sent from the encryption engine with the synchronization message; and
   a first transceiver configured to transmit the formatted voice packets.

2. The device of claim 1, wherein the encrypted voice packets being replaced by the synchronization message comprise encrypted voice packets that include the least significant bits of the encrypted voice frame, and wherein the encrypted voice packets and synchronization messages are formatted to fit within the half-duplex PTT voice channel.

3. The device of claim 1, wherein the encryption engine, comprises:
   an encryption engine configured to use the encryption key and the updated state vector to encrypt the voice packets.

4. The device of claim 1, wherein the first transceiver is configured to transmit the formatted and encrypted voice packets and the synchronization message to the second transceiver over the half-duplex PTT voice channel.

5. The device of claim 1, wherein the secure device further comprises:
   a secure PTT call phone book directory, wherein an asymmetric key exchange is initiated in advance of a secure PTT call when a client number/identifier of the other secure device is entered in the secure PTT call phone book directory.

6. The device of claim 1, wherein the secure device further comprises:
   an address book, wherein an asymmetric key exchange is initiated in advance of a second secure PTT call when the secure device selects the other secure device listed in the address book and designates the other secure device as being authorized for secure PTT calls, and
   wherein the secure device is adapted to call the other secure device while the secure device is idle to establish the security association via the asymmetric key exchange before initiating the second secure PTT call.

7. A secure device, comprising:
   a transceiver configured to receive a voice frame comprising encrypted/formatted voice packets and an updated state vector comprising a synchronization message;
   a memory for storing a previously established security association from a first session between the secure device and another secure device, wherein the stored security association comprises the encryption key and the first state vector and wherein the stored security association can be used during a second session between the secure device and the other secure device; and a decryption engine configured to use the encryption key and the synchronization message to decrypt the encrypted/formatted voice packets received by the transceiver, wherein the decryption engine uses the synchronization message to initialize cryptographic synchronization at the start of the first secure voice frame to thereby compensate for any voice packets lost or gained during transmission.

8. A secure wireless Push-to-Talk (PTT) dispatch system, comprising:

a first device, comprising:

a first memory for storing a previously established security association from a first session between the first device and a second device, wherein the stored security association comprises an encryption key and a first state vector, wherein the stored security association is adapted for use during a second session between the first device and the second device;

a vocoder configured to generate voice packets from a voice input signal;

a vector generator configured to generate an updated state vector comprising a synchronization message for maintaining secure call synchronization, wherein the vector generator comprises: a synchronization message generator configured to generate the synchronization message;

an encryption engine configured to use the stored security association and the updated state vector to encrypt the voice packets;

a modem configured to format the encrypted voice packets to fit within half-duplex PTT voice channel, wherein the modem further comprises: a synchronization message insertion unit configured to replace at least part of at least one of the encrypted voice packets of an encrypted voice frame being sent from the encryption engine with the synchronization message; and a first transceiver configured to transmit the formatted voice packets.

9. The system of claim 8, further comprising a second device, wherein the second device comprises:

a second transceiver configured to receive the formatted voice packets;

a second memory configured to store the security association for use during a second session between the second device and the first device; and a decryption engine configured to use the cached security association to decrypt the formatted voice packets received from the first transceiver.

* * * * *